Patented June 5, 1951

2,555,972

UNITED STATES PATENT OFFICE 2,555,972

PREPARATION OF PHOSPHATIDES

Sulo A. Karjala and Fred W. Riley, Decatur, Ind., assignors to Central Soya Company, Inc., Fort Wayne, Ind., a corporation of Indiana No Drawing. Application March 27, 1948, Serial No. 17,597

6 Claims. (Cl. 99—118)

This invention relates to the preparation of phosphatide compositions, including new phosphatide products, and the method of preparing the same. The invention is particularly useful in the preparation of phosphatide products which may be mixed readily without loss in various food and industrial applications, while at the same time being stable against oil separation.

The commercial phosphatides now available consist of heavy viscous fluids or semi-solid plastic masses, with an acetone insoluble content of 63% to about 68%, the nominal standard in the industry being about 65%. The acetone insoluble content is a measure of the phosphatide content of the commercial phosphatides. The latter consist of a mixture of approximately 65% of phosphatides and 35% of oil. The phosphatides are insoluble in acetone, while the oil is soluble, and the extent of insolubility of commercial phosphatides in acetone gives a ready measure of the phosphatide content.

Phosphatides are used in many food and industrial applications, their use, in most cases, being of the order of 0.1% to 0.5%. Since such small amounts are required, their use is accompanied by considerable inconvenience, loss, and waste of phosphatide due to the high viscosity and tendency to stick to containers, paddles, scoops, and the like. Difficulty is encountered in attempts to weigh a given amount into a batch of food or industrial material.

An object of the present invention is to provide a product and process which will obviate the above difficulties. Yet another object is to provide a phosphatide composition which may be easily mixed without loss in food or industrial material, while at the same time providing a low viscosity mixture which is stable against oil separation. Yet another object is to provide a low viscosity phosphatide composition which is stable against oil separation and which is prepared by diluting commercial phosphatides or the like with vegetable oil and with the addition of small amounts of propylene glycol and fatty acids to prevent separation of phosphatides and oil. Other specific objects and advantages will appear as the specification proceeds.

Phosphatides are found in practically all vegetable oils, the best and most economical source being soybean oil. When crude soybean oil is isolated from soybeans by hydraulic pressure or screw press methods, or by solvent extraction followed by elimination of the solvent by distillation and vacuum stripping, the oil is found to contain approximately 2% phophatides on the average.

As long as the oil is dry, the phosphatides remain dissolved in the oil, but on standing in storage, water is absorbed by the oil. The water reacts with the phosphatides to form hydrated phosphatides, which differ essentially from the phosphatides by being insoluble in oil, and which separate as the well-known "foots," "settlings," and "tank bottoms." In this form, the precipitate decreases the value of the oil because of the oil losses which occur due to the presence of these tank bottoms during the refining of the oil.

It was discovered many years ago that if water were added to the crude oil obtained by expression or solvent extraction, the phosphatides should be hydrated and removed by settling or centrifugal methods to yield a high quality low-break oil on the one hand, and a valuable phosphatide on the other. The phosphatide isolated from vegetable oils generally contains a ratio of about two parts of phosphatide to one part of the parent oil, together with a widely varying amount of water, depending upon the amount of water which was used for the hydration of the phosphatides. The hydrated phosphatide is usually dried in a vacuum, the resultant product generally being a plastic solid or a highly viscous fluid at room temperature, containing about 65% phosphatides and 35% oil. The plasticity or fluidity appears in part to be a function of the moisture content of the final product. If the moisture content is below about 1%, the product is usually a heavy viscous fluid, while if it is above about 1%, the product is usually a plastic solid. Phosphatides of low moisture content will readily absorb moisture, with the formation of a heavy plastic film over the surface of the fluid mass, the depth of the plastic layer being a function of the amount of moisture absorbed. When large amounts of moisture, in the neighborhood of 3–5%, are absorbed, the plastic product shows signs of bleeding of oil droplets to the surface.

All of these phenomena are believed to be due to the rapid reaction of the phosphatides with moisture, and the solubility of phosphatides in oil, together with the insolubility of hydrated phosphatides in oil. Commercial phosphatides then consist of approximately 65% of a mixture of phosphatides and hydrated phosphatides and 35% of parent oil, which is capable of dissolving the phosphatide but not the hydrated phosphatide, and the product will be a viscous fluid or a plastic solid, depending upon the relative amounts of the phosphatides and hydrated phosphatides present.

Several attempts have been made to prepare fluid phosphatide compositions by the addition of rather large amounts of fatty acids. For example, Karl Braun and R. Rosenbush, U. S. Patent No. 2,168,468, claim a fluid phosphatide product containing 75–100 parts of commercial phosphatide, 3–50 parts of mixed castor oil fatty acids, and 2.5–10 parts of triethanolamine. Gustav Adolf Wiesehahn, U. S. Patent No. 2,194,842, claims a method for the addition of up to 20% of free fatty acids to commercial phosphatides. Josef Talalay, British Patent No. 455,534, describes a mixture of commercial phosphatides containing 25% of stearic, palmitic, or oleic acids for use in rubber compounding.

It is well known that dilution of the phosphatide mixture with vegetable oil has not been feasible, because of the rapid tendency of the oil to separate on storage, particularly at temperatures below room temperature. The resultant product consists of an upper layer of oil saturated with phosphatides, and a lower viscous layer of phosphatides and hydrated phosphatides saturated with oil. This separation probably occurs in much the same way as the separation of phosphatides from crude oil on storage. The mass absorbs moisture from the atmosphere, and the moisture reacts with the phosphatides to form hydrated phosphatides. When the concentration of hydrated phosphatides exceeds the solubility of the hydrated material in the oil, separation occurs, the hydrated material drawing with it the major portion of the unhydrated phosphatides as well.

However, the use of large amounts of fatty acids is not a complete solution to the problem, for several reasons. Phosphatides, having a viscosity of over 100,000 centipoises at 80° F., will show a gradual drop in viscosity, with increase in fatty acids to 15,000–20,000 centipoises at 80° F. when approximately 10% of fatty acid is added. Additional amounts of fatty acid cause no further decrease in viscosity, and occasionally may even cause an increase.

This product, with a viscosity of 15,000–20,000 centipoises at 80° F., is still too viscous for ready use. The flow rate is slow, and large amounts of material are retained on the sides of the container. Since most baking, chocolate and industrial uses for phosphatides call for its use in amounts of 0.1–0.5%, considerable inconvenience arises in its use due to the difficult handling problems.

Moreover, since the fatty acids are considerably more expensive than oil, the addition of large amounts of fatty acids gives rise to a more expensive product. The final product also has a high acidity, which makes it unsatisfactory for many applications.

We have discovered that a vegetable oil can be successfully used for lowering the viscosity of phosphatides, while at the same time rendering the product stable against oil separation through the use of small amounts of propylene glycol and of fatty acids. As a specific example, a commercial phosphatide composition may be mixed with soybean oil to lower the viscosity thereof to 1,000–7,000 centipoises at 80° F., while the oil separation is avoided by the addition of about 1–6% of propylene glycol and about 2–4% of fatty acids. It will be understood that some variation in the ranges set out may be necessary depending upon the special properties desired in the final product. Ordinarily, percentages of 2–3% of propylene glycol and 3–4% of fatty acids will be found satisfactory.

The propylene glycol apparently forms a complex with the phosphatides in the presence of small amounts of fatty acids to give a product that remains in homogeneous solution or dispersion in the oil, even though amounts of moisture up to 2–3% are absorbed. This would appear to be the case since the product obtained, on dilution of the phosphatides with oil, becomes plastic when 2–3% of propylene glycol is added without additional fatty acid.

The propylene glycol may be the commercial edible grade propylene glycol when the phosphatide composition is intended for food uses, or other commercial grades for industrial uses.

Any of the common high molecular weight fatty acids may be used, such as lauric, palmitic, stearic, oleic, mixed vegetable oil and animal oil fatty acids, or other individual or mixed aliphatic acids with carbon chains of 12 to 22 carbon atoms. We have found mixed soybean oil fatty acids very useful. The low molecular weight aliphatic acids are undesirable because of their high volatility, odor, water solubility and corrosiveness to iron equipment.

The use of fatty acids alone, without propylene glycol, for stabilizing mixtures of commercial phosphatides and soybean oil, gives rise to products of low stability, as indicated in the examples below. The propylene glycol appears to be the primary stabilizing agent.

For the dilution of the product, any triglyceride, which will produce a fluid composition at room temperature, may be employed. This will include both animal and vegetable triglycerides. We find that soybean oil is particularly desirable. It may be a crude oil or degummed oil. The degummed soybean oil, which is oil from which the phosphatides have been removed, is preferable and, further, is most readily obtainable in a phosphatide plant. Other vegetable oils, such as cottonseed oil, peanut oil, etc. are also highly desirable.

The order of addition of the various additives is unimportant. They may be mixed with the hydrated phosphatides in any order, or they may be added after partial drying, before or after bleaching, or just prior to final drying.

The use of glycerol as a solvent for phosphatides has been reported by Bergell in German Patents Nos. 231,233 and 370,039. No percentages are given, but since glycerol is used as a solvent, and lecithin as a solute, the percentage of glycerol must be considerably greater than 1–6% of glycerol or glycols. No other additives are used. In German Patent No. 438,328, Bergell states that the mixtures contain ten parts of glycerol and one part of phosphatide. This same patent also describes a modified phosphatide product obtained by heating equal parts of phosphatide and glycerol at 80–110° C. (176° to 230° F.) for 2 to 3 hours. Magat, in U. S. Patent No. 1,741,786, describes an emulsion of 1 part of lecithin in 10 parts of water, to which 2 parts of glycerol and 0.06 part of electrolyte are added, to yield a fluid medicinal emulsion capable of being injected. British Patent No. 475,949 to the I. G. Farbenindustrie A.-G., describes the use of polyethyleneglycol ethers of fatty alcohols of high molecular weight as agents in the production of clear aqueous solution of phosphatides and other lipoids. Mattikow, in U. S. Patent No. 2,271,127, describes the production of phosphatide compounds by heating phosphatides and glycerol with a basic catalyst to temperatures of 200–400° F. The product was reported to be dispersible in water. Jordan, in U. S. Patent No. 2,296,933, prepares a water-dispersible phosphatide by dissolving the lecithin in 10 to 50 percent, preferably 40 percent, of ethyl lactate, propylene glycol or the various ethers of ethylene or diethylene glycol sold commercially under the name of "Cellosolves" and "Carbitols." The purpose of this addition is to make the lecithin more readily emulsifiable in water, and has no relation to the invention described herein.

The hydrated phosphatide employed in the present invention as a starting point may be prepared by any suitable method. An unusually satisfactory method is that set out in the Kruse U. S. Patent No. 2,269,772. This product is preferred since it is low in moisture and has a more constant moisture content from one batch to the next, thus allowing more uniform production of the desired composition.

Specific examples of the process and composition may be set out as follows:

Example 1

A sample of hydrated phosphatides was worked in a mixer at 150° F. until fluid, bleached by known methods, and dried in a vacuum. The resultant product had an acetone-insoluble content of 70.0% and a moisture content below 1%. Two hundred grams of this product were mixed with 11.2 grams of oleic acid (4% of the final weight), 5.6 grams of propylene glycol (2% of the final weight), and 63.2 grams of soybean oil. After thorough mixing, the product was vacuum dried, giving a phosphatide composition with an acetone insoluble content of 50% and a viscosity of 1,000 centipoises at 80° F. This product has not shown oil separation on standing at 45° F. for 230 days. When the product was prepared with 3% of oleic acid and no propylene glycol (with addition of 2% more soybean oil to yield the same acetone-insoluble content), a product with a stability of only 4 days at 45° F. was obtained. When 2% oleic acid plus 2% palmitic acid, or 2% oleic acid plus 2% stearic acid was used in the same way, products with a stability of only 5 days at 45° F. was obtained.

Example 2

A sample of hydrated phosphatides was analyzed and found to contain 67.5% acetone insoluble material on the dry basis and 10.5% moisture. A 223 gram portion of the hydrate, representing 200 grams of dry material, was mixed at 150° F. until fluid, bleached by known methods to the desired color, and treated with 9.8 grams (4% of the final weight) of oleic acid, 7.4 grams (3% of the final weight) of propylene glycol, and 28.3 grams of soybean oil. The fluid mixture was dried under vacuum, yielding a product with an acetone-insoluble content of 55%, and a viscosity of 3,250 centipoises at 80° F. This product has not shown oil separation on storage at 45° F. for 240 days. When a product of 55% acetone-insoluble content was prepared in the same way except that 3% of oleic acid was used without propylene glycol (with addition of 3% more soybean oil to yield the same acetone-insoluble content), the product had a stability of only 4 days at 45° F. With 2% of oleic acid plus 2% of stearic acid used in the same way, a product stable for only 10 days at 45° F. was obtained.

Example 3

A large batch of phosphatide hydrate was fluidified in a jacketed mixer at 150° F., bleached by known means, and treated with 4% oleic acid on the dry basis. The mixer was then dried in a vacuum to a final moisture content below 1%. The acetone-insoluble content of this product was found to be 63.3%. A total of 1,022 pounds of this material was treated in two portions, with a total of 35 pounds of propylene glycol and 118 pounds of soybean oil. The two portions were combined in the vacuum dryer and dried at a temperature of 150–160° F. The final product had an acetone-insoluble content of 54.5%, a moisture content of 1.0%, and viscosity of 2,500 centipoises at 80° F. No oil separation has occurred in this product after storage at 45° F. for 120 days.

Example 4

A sample of low-viscosity phosphatide, with a final acetone-insoluble content of 55%, was prepared as in Example 2. The product had a viscosity of 3,600 centipoises at 80° F., and has shown no indication of oil separation on storage at 60° F. for 250 days.

Example 5

A 200 gram sample of the same dried product used in Example 1, containing 70.0% acetone-insoluble material and less than 1% moisture, was mixed well with 11.2 grams of oleic acid (4% of the final weight), 8.4 grams of propylene glycol (3% of the final weight), and 60.4 grams of soybean oil. The mixture was dried in a vacuum, and a final product was obtained with an acetone-insoluble content of 50% and a viscosity of 80° F. of 1,000 centipoises. No oil separation was found in this sample after storage at 45° F. for 230 days.

While, in the foregoing specification, we have set forth certain steps in considerable detail for the purpose of illustrating the invention, it will be understood that the details thereof may be modified widely by those skilled in the art without departing from the spirit of our invention.

We claim:

1. As a new composition of matter, a phosphatide and oil composition of low viscosity at room temperature and stable toward oil separation, consisting of 50–60% phosphatides, a high molecular weight fatty acid, vegetable oil, and from 1–6% of propylene glycol.

2. As a new composition of matter, a phosphatide and oil composition of low viscosity at room temperature and stable toward oil separation, consisting of 50–60% phosphatides, 2–4% of high molecular weight fatty acid content, 30–47% vegetable oil, and 1–6% propylene glycol.

3. The composition of claim 1 in which the phosphatides are soybean phosphatides and the vegetable oil is soybean oil.

4. In a process of the character set forth, in which phosphatides are mixed with high molecular weight fatty acids and vegetable oil, the step of adding from 1–6% thereto of propylene glycol, and drying the product in a vacuum.

5. In a process of the character set forth, the steps of heating hydrated phosphatides and vegetable oil added thereto under vacuum until substantially dry, adding small amounts of propylene glycol and high molecular weight fatty acids thereto under agitation, and drying the same.

6. In a process of the character set forth for producing a stable low viscosity phosphatide composition, the steps of heating hydrated phosphatides until fluid, drying the phosphatides in a vacuum to remove the bulk of the water, adding a mixture of vegetable oil and from 1-6% of propylene glycol and from 2-4% of a high molecular weight fatty acid, and drying the mixture.

SULO A. KARJALA.
FRED W. RILEY.

REFERENCES CITED

The following references are of record in the file of this patent:

UNITED STATES PATENTS

| Number | Name | Date |
| --- | --- | --- |
| 2,269,772 | Kruse | Jan. 6, 1942 |
| 2,271,127 | Mattikow | Jan. 27, 1942 |
| 2,296,933 | Jordan | Sept. 29, 1942 |